Patented Oct. 26, 1937

2,097,119

UNITED STATES PATENT OFFICE 2,097,119

BLEACHING-OUT DYE LAYERS

John Eggert, Leipzig-Gohlis, and Bruno Wendt and Alfred Fröhlich, Dessau in Anhalt, Germany, assignors to I. G. Farbenindustrie Aktiengesellschaft, Frankfort-on-the-Main, Germany, a corporation of Germany No Drawing. Application September 26, 1933, Serial No. 691,080. In Germany September 30, 1932

6 Claims. (Cl. 95—7)

Our present invention relates to bleaching-out dye layers.

One of its objects is a process of preparing bleaching-out dyes. Another object is the bleaching-out dye layers containing the bleaching-out dyes.

Bleaching-out dye layers are already known which have incorporated xanthoxonium dyes containing in the 3 and 6 positions either amino groups or hydroxy groups.

We have found that bleaching-out dye layers having incorporated a xanthoxonium dye containing in the 3 position an unsubstituted or a substituted amino group and in the 6 position the hydroxyl group, or an alkoxy group, or an aryloxy group, or an acyl group, and vice versa, are superior to the hitherto known bleaching-out dye layers as regards their bleaching-out velocity and the purity of the whites.

The dyes suitable for the purpose of the invention correspond with the general formula

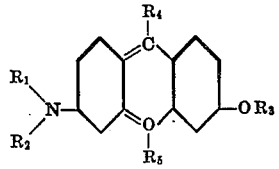

In this formula $R_1$, $R_2$, and $R_3$ stand for hydrogen; an aliphatic radical, for instance, methyl or ethyl; an aromatic radical, for instance, phenyl or benzyl; or an acid radical, for instance, acetic acid or benzoic acid, $R_4$ stands for hydrogen; an aliphatic radical, for instance, methyl or ethyl; or an aromatic radical, for instance phenyl or substituted phenyl, $R_5$ stands for an inorganic acid radical, for instance, the radical of hydrochloric acid or sulfuric acid; or an organic acid radical, for instance, acetic acid or benzoic acid.

In the above formula the benzene nuclei may be further substituted, besides the 3 and 6 positions. Moreover, the benzene nuclei may be replaced by other aromatic ring systems.

The dyes are obtainable by condensing monoacetyl-m-amidophenol with benzotrichloride or a substitution product of benzotrichloride for preparing the dyes in which $R_4$ stands for an aromatic radical or with acetaldehyde or another higher aliphatic aldehyde for preparing the dyes in which $R_4$ stands for an aliphatic radical, in the presence of a condensing agent. Suitable condensing agents are zinc chloride, aluminium trichloride or tin tetrachloride. The resulting 3-acetamino-fluorone may then be converted into the required dye. Thus, for obtaining the alkoxy substituted dyes the fluorone is treated with an alkylating agent for instance, dialkylsulfate, for obtaining aryloxy substituted dyes the flourone is phenylated in known manner, for obtaining acyl substituted dyes the fluorone is treated with the required acid chloride.

The bleaching-out dye layers are prepared in known manner by applying a solution containing the dye, a sensitizer, an acid compound and a binding agent to a suitable base.

The following examples serve to illustrate the invention, Examples 1 to 5 illustrating bleaching-out dyes and Examples 6 and 7 illustrating bleaching-out dye layers.

*Example 1.*—3-amino-6 - hydroxy - 9 - phenyl-xanthoxoniumchloride corresponding with the formula

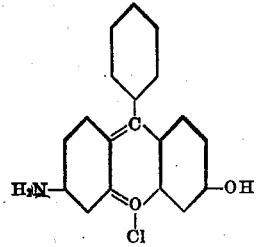

may be obtained as follows:

| | Grams |
|---|---|
| Mono-acetyl-m-amidophenol | 50 |
| Benzotrichloride | 28 |
| Nitrobenzene | 100 |
| Anhydrous zinc chloride | 10 | are rapidly heated to 120° C. in an oil bath, then slowly further heated to 145–150° C. and kept at this temperature for about 5 hours. Then the mixture is dissolved in alcohol and the nitrobenzene is removed by distillation with water. The residue is dried on the steam bath in the vacuum in the presence of phosphorus pentoxide and pulverized. 28 grams of the brown powder are mixed with 14 grams of sodium acetate and 224 grams of acetic anhydride, and boiled for about 10 minutes. After cooling the solution is cast on ice, there is added hydrochloric acid until the solution has become acid when tested with Congo paper, then the solution is added to ¾ liter 80° C. hot water, and filtered at 40 to 50° C. The cooled filtrate is mixed with ammonia as long as precipitate separates, while cooling so intensely that 20° C. is not surpassed. The precipitate is filtered and washed with a small quantity of alcohol and acetone. The light red powder obtained is the acetamido-phenylfluorone. By treating the acetamido-phenylfluorone with diluted sulfuric acid the acetylamino group is saponified and the dye obtained.

Example 2.—The dye 3-acetylamino-6-methoxy-9-phenylxanthoxonium chloride corresponding with the formula

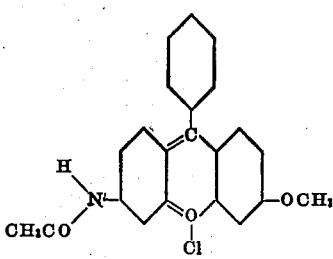

is obtainable as follows:

3.5 grams of acetamino-phenylfluorone as obtained according to Example 1 are dissolved in 20 cc. of boiling freshly distilled nitrobenzene. This mixture is distilled until the distillate comes clear and then there are added 1.55 grams of freshly distilled dimethylsulfate to the residue. After cooling the mixture is run into 1 liter of ether so that the precipitate is obtained in form of a powder. The precipitate is filtered, washed with ether and dried in the vacuum. Then the product is suspended in water and the water decanted as long as the decanted liquid yields a precipitate on the addition of common salt. The precipitates thus obtained are collected by filtering and dried in the presence of phosphorus pentoxide. The dry precipitate is extracted in a Soxhlet, the greatest part of alcohol evaporated and the residue added to a mixture of alcohol and ether. Now, there is introduced dry gaseous hydrochloric acid until the precipitate deposits, then the precipitate is filtered, washed with much ether and dried in the presence of phosphorus pentoxide.

Example 3.—The dye 3-amino-6-methoxy-9-phenylxanthoxonium chloride corresponding with the formula

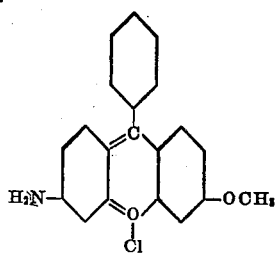

is obtainable when treating the dye obtained according to Example 2 with diluted hydrochloric acid until the acetylamino group is saponified.

Example 4.—The dye 3-amino-6-hydroxy-9-para-chlorophenyl-xanthoxonium chloride corresponding with the formula

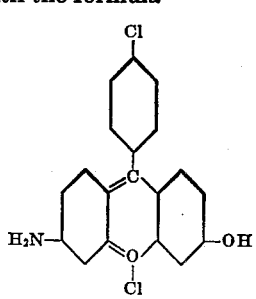

is obtainable when working according to the method described in Example 1 but using chlorobenzotrichloride instead of benzotrichloride.

Example 5.—The dye 3-amino-6-hydroxy-9-methylxanthoxonium sulfate corresponding with the formula

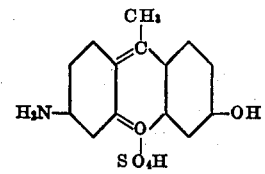

is obtainable by condensing mono-acetyl-m-amidophenyl with acetaldehyde in the presence of tin tetrachloride in a manner analogous to that described in Example 1.

Example 6.—8 milligrams of 3-acetylamino-6-methoxy-9-phenylxanthoxonium-chloride,
    0.2 gram of maleic acid, and
    0.2 gram of diethylthiosinamine are dissolved in 50 cc. of a collodion solution of 3 per cent. strength and this mixture is applied on 400 square cm. of baryta paper.

Example 7.—120 grams of a solution of 6 per cent. strength of ethyl cellulose in a mixture of benzene and alcohol (1:1) are mixed with 50 grams of a solution of 10 per cent. strength of nitrocellulose in ether-alcohol (3:1) and to this mixture there are added 10 grams of maleic acid in 18 grams of alcohol,
93 cc. of a 1/1000 n-solution of diethylamino-pheno-aminonaphthoxazonium sulfate (Nile blue A, see: Schultz, Farbstofftabellen, 7th edition, No. 1029) in alcohol,
40 cc. of a 1/250 n-solution of 3-ethoxy-6-acetylamino-9-phenyl-9.10-xanthoxonium chloride in alcohol,
60 cc. of a 1/1000 n-solution of 2.7-diethoxy-3.6-diethyl-amino-9.10-carbselenonium chloride in alcohol,
2.5 grams of symmetrical diallylthiourea, and
6 drops of conc. hydrochloric acid.

This solution is applied on baryta paper provided with a coating made of caoutchouc containing maleic acid. After printing under a colored pattern, fixing is effected with a mixture of benzene and anisol in the proportion of 3:1.

What we claim is:

1. A bleaching-out dye layer comprising a binding agent, a sensitizer, an acid compound and a dye corresponding with the formula

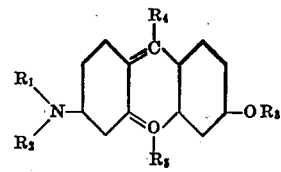

$R_1$, $R_2$ stand for hydrogen, or the radical of a fatty acid
$R_3$ stands for hydroxyl or an alkoxy group
$R_4$ stands for hydrogen, alkyl or an aromatic radical of the benzene series
$R_5$ stands for an acid radical.

2. A bleaching-out dye layer comprising a binding agent, a sensitizer, an acid compound and 3-amino-6-hydroxy-9-phenylxanthoxonium-chloride.

3. A bleaching-out dye layer comprising a binding agent, a sensitizer, an acid compound and 3-acetylamido-6-methoxy-9-phenylxanthoxoniumchloride.

4. A bleaching-out dye layer comprising a binding agent, a sensitizer, and an acid compound and 3-amino-6-hydroxy-9-para-chlorophenylxanthoxoniumchloride.

5. A photographic material comprising a support and applied to this support a bleaching-out dye layer comprising collodion, 3-acetylamino-6-methoxy-9-phenylxanthoxoniumchloride, maleic acid and diethylthiosinamine.

6. A bleaching-out layer comprising a binding agent and a xanthoxonium dye substituted in the 3-position by an amino group, and in the 6-position by a radical selected from the group consisting of the hydroxyl group, an alkoxy group, an aryloxy group and an acyl group said aryl being of the benzene series.

JOHN EGGERT.
BRUNO WENDT.
ALFRED FRÖHLICH.